(12) United States Patent
Andersson et al.

(10) Patent No.: US 7,805,437 B1
(45) Date of Patent: Sep. 28, 2010

(54) INTERACTIVE SAR TABLE

(75) Inventors: Tomas Åke Andersson, Göteborg (SE);
Leif Fredrik Blom, Frillesås (SE);
William M. Ladd, Cambridge, MA (US)

(73) Assignee: Spotfire AB, Göteborg (SE)

( * ) Notice: Subject to any disclaimer, the term of this patent is extended or adjusted under 35 U.S.C. 154(b) by 288 days.

(21) Appl. No.: 10/439,411

(22) Filed: May 15, 2003

Related U.S. Application Data

(60) Provisional application No. 60/380,885, filed on May 15, 2002.

(51) Int. Cl.
*G06F 7/00* (2006.01)
*G06F 17/30* (2006.01)

(52) U.S. Cl. ............. 707/722; 707/754; 707/758; 707/769; 703/12

(58) Field of Classification Search ............ None
See application file for complete search history.

(56) References Cited

U.S. PATENT DOCUMENTS

| | | | | |
|---|---|---|---|---|
| 5,980,096 | A * | 11/1999 | Thalhammer-Reyero | .... 707/100 |
| 6,014,661 | A * | 1/2000 | Ahlberg et al. | ........... 707/3 |
| 6,295,514 | B1 * | 9/2001 | Agrafiotis et al. | .......... 703/12 |
| 6,323,852 | B1 * | 11/2001 | Blower et al. | ........... 715/804 |
| 6,675,136 | B1 * | 1/2004 | Gottfries et al. | ............ 703/2 |
| 2002/0077757 | A1 * | 6/2002 | Bunin et al. | ............ 702/32 |
| 2004/0073527 | A1 * | 4/2004 | Sherr | ............ 706/20 |

OTHER PUBLICATIONS

"Chemical Database Techniques in Drug Discovery", by Mitchell A. Miller, Nature Reviews, Mar. 2002, vol. 1, Nature Publishing Group, pp. 220-227.*

"Computatinal Chemistry Impact: New developments in underlying software propel technology into activities spanning discovery cycle", by James H. Krieger, American Chemical Society, May 12, 1997.*

\* cited by examiner

*Primary Examiner*—Jay A Morrison
(74) *Attorney, Agent, or Firm*—Kristofer E. Elbing

(57) ABSTRACT

Source data is analyzed and visualized for a user. As the user adjusts graphical query devices, the displayed data is filtered and the visualization is updated accordingly. The invention is particularly useful where the data relates to chemical compounds in that a SAR table is preferably generated, presented in the visualization, and updated according to the query device settings. The displayed SAR table entries may also be clustered as a function of similarity with respect to a chosen property, such as molecular weight or some topological characteristic. A hierarchy of similarity may then be indicated in the SAR table using, for example, a dendrogram.

12 Claims, 5 Drawing Sheets

INTERACTIVE SAR TABLE

CROSS-REFERENCE TO RELATED APPLICATIONS

This application claims priority of U.S. Provisional Patent Application No. 60/380,885, filed 15 May 2002.

BACKGROUND OF THE INVENTION

1. Field of the Invention

This invention relates to the field of visualization of data and relationships between the data, especially in the context of SAR (Structure Activity Relationship) tables.

2. Description of the Related Art

A SAR (Structure Activity Relationship) table is a well known and established concept within the cheminformatics community. A SAR table according to the prior art displays the relationship between chemical structure and activity for a set of chemical compounds in the form of a table of rows and columns. One column contains the chemical structures, while the other columns show other compound properties, or descriptors. The descriptors—typically various biological activity values—are usually numbers, but text information can also be of interest.

A unique compound identifier is also usually included in the SAR table. FIG. 1 illustrates a simplified view of an MDL® ISIS for Microsoft® Excel® spreadsheet, in which, by way of example, benzene, bromobenzene, chlorobenzene, fluorobenzene, benxoic acid, and ethyl benzoate are shown as having the identifiers 2-7, respectively, in column A.

Several known commercial computer programs feature more or less sophisticated SAR table functionality. Examples of such functionality are included in the ISIS for Microsoft Excel and Accelrys® DIVA® programs.

Dynamic Filtering

The concept of dynamic filtering of data sets is not specific to the cheminformatics area; rather, it is a general purpose technique that is applicable to many different areas of research and decision making processes. Dynamic filtering using a set of graphical query devices was first introduced in the products of Spotfire AB of Göteborg, Sweden (also, Spotfire, Inc., of Somerville Mass.) and is disclosed in U.S. Pat. No. 6,014,661 (Ahlberg, 11 Jan., 2000), which is incorporated here by reference.

In the Spotfire® DecisionSite® software product, which incorporates the technology disclosed in U.S. Pat. No. 6,014,661, query devices tied to columns in the data set and different visualizations of the data allow users to dynamically filter their data sets based on any available property, and hence interactively visualize the data. As the user adjusts graphical query devices such as rangesliders and alphasliders, DecisionSite changes the visualization of the data accordingly. DecisionSite also includes several other automatic features, such as initial selection of suitable query devices and determination of ranges, that aid the user not only to visualize the data but also to mine it. When properly used, this technique constitutes a powerful tool that forms the basis for sophisticated data exploration and decision-making applications.

FIG. 2 illustrates one example of how different query devices (a set of check boxes 201 and rangesliders 202, 203, for example) in Spotfire DecisionSite can be used to dynamically filter data points of specific interest to someone working with microarray data. In the illustrated case, only check boxes YC and YD are checked, indicating that only genes on yeast chromosomes C and D for which the activity (here, protein production level), exceeds a certain threshold value (0.2), as measured by their standard deviations, are to be included in the visualization. As the user drags the range slider 203 (shown set at 0.2) for the standard deviation column (StdDev) further to the right, only genes with increasingly higher activity will remain visualized.

Spotfire DecisionSite also includes the ability to display a data set as a table of rows and columns. Such table visualizations can be dynamically filtered just like all other Spotfire visualization types. Table visualizations can include graphics, which allows the basic principle of dynamic filtering to be extended to data types with much greater complexity than numbers and text strings.

One problem with prior art visualization tools, however, is that even those with graphics support cannot dynamically filter and visualize a SAR table, or other visualization in which data such as chemical compounds is commonly represented and best interpreted by some graphical structure. It may be difficult or impossible for a user to readily see that different compounds all include a benzene ring, for example, based on displayed sets of formulae and numbers alone. What is needed is a dynamic visualization technique that overcomes this weakness, especially in the context of a SAR table.

SUMMARY OF THE INVENTION

The invention provides a method for visualizing data for a user based on dynamic, interactive filtering of data. Accordingly, a user setting of at least one graphical query device is sensed and the data is filtered according to the user settings. Part of the visualization of the data includes generating and displaying a representation of a structure activity relationship (SAR) table corresponding to the filtered data. The representation of the SAR table is then updated in real time as the user changes the settings of the graphical query device(s).

The invention is therefore particularly useful for visualizing data relating to chemical compounds. For example, to help users identify "drug-like" compounds, the invention can generate query devices that allow the user to adjust the four standard parameters of Lipinski's "Rule of 5."

According to an optional feature of the invention, the SAR table entries are graphically clustered according to a compound property. For example, a dendrogram may be generated to indicate how different SAR table entries relate to each other with respect to some compound property, such as similar topology or molecular weight.

DETAILED DESCRIPTION

In broadest terms, the invention provides an interactive SAR table that combines a SAR table and the ability to dynamically filter data sets using graphical query devices. The interactive SAR table according to the invention thus differs from the ordinary SAR table in that the contents of the SAR table can be modified in a dynamic fashion and its contents, extended to include chemical structures, can be visualized interactively together with all other visualizations the user has tied to the data set.

Since chemical structures are included in the table together with other descriptors of interest, it is possible to perform an interactive SAR analysis in which the dynamic nature of the SAR table, combined with other linked and equally dynamic visual representations of the data set, adds an analytic dimension that is not readily present in the case of a non-interactive SAR table. The analysis also differs from regular data analysis in the sense that complex data objects (here, chemical structures) are interactively visualized in the same context as regular data objects, such as numbers and text strings.

Interactive Filtering

Figure 7:
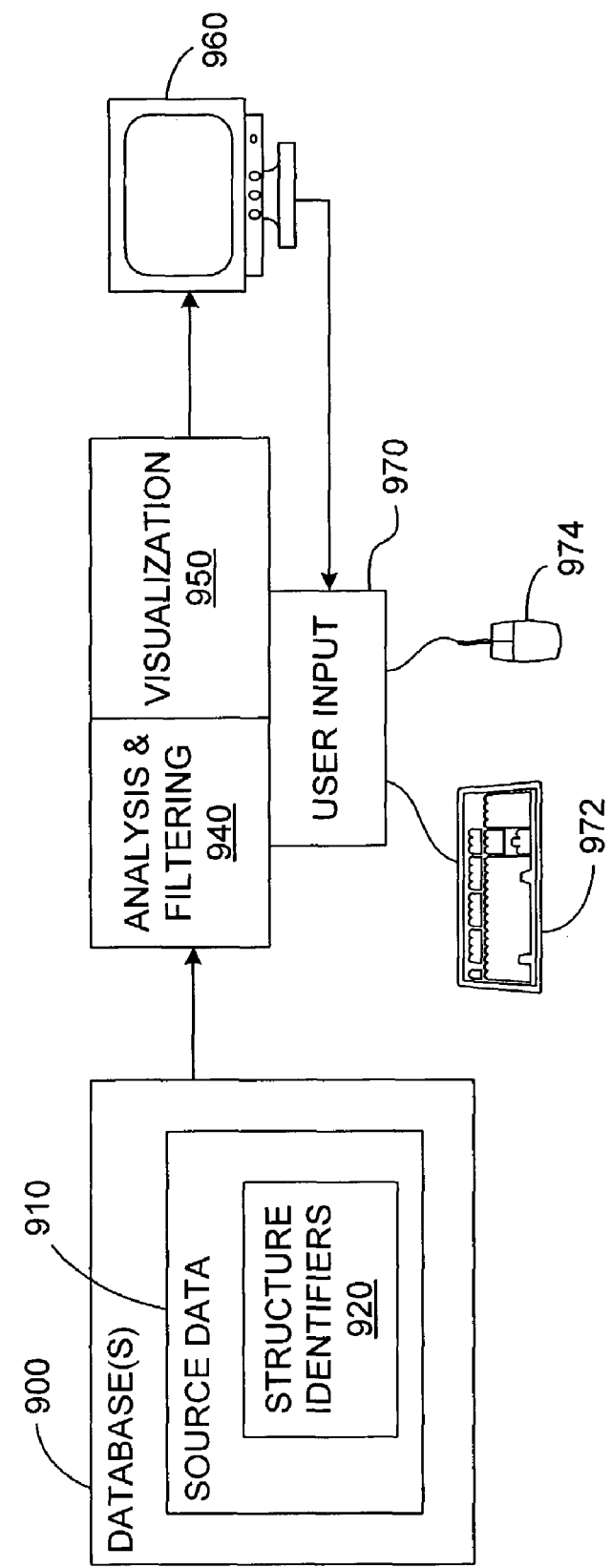
FIG. 7 shows the main components of a system that implements an interactive visualization of a SAR table.

FIG. 7 illustrates the main components of a system that implements the invention: One or more databases 900 include a set of source data 910. This database is queried in any conventional manner (for example using SQL commands) to retrieve records of interest, which are analyzed in a software module 940 and prepared for visualization by a visualization routine 950. In the Spotfire DecisionSite software, the analysis and visualization modules are part of a single software package. The data of interest is then presented for viewing on a display 960. Using conventional input devices such as a keyboard 972 and mouse 974, the user adjusts the various graphical (and text-based) query devices presented on the display 960. The adjustments are sensed by an input module 970, which will usually be routines connected to or even part of the visualization routine 950.

Any analysis and visualization routines may be used according to the invention as long as they allow the displayed visualization to be interactively adjusted by the user. A system as described in U.S. Pat. No. 6,014,661 is preferred because it is known to be able to automatically extract data from a database, classify it by type, generate suitable query devices, and visualize it in different ways according to user input. This system can also automatically look for relationships between different fields of data; although this feature is not required according to the invention, it often helps users discover patterns in the data that they could not readily identify manually.

Note that when dynamic filtering is performed, the data itself does not change. Instead, the appearance of data points within and linking of data points between visualizations change, which may reveal important trends and patterns in the data set. This is true for chemical structures as well as for any other data types.

Figure 1:
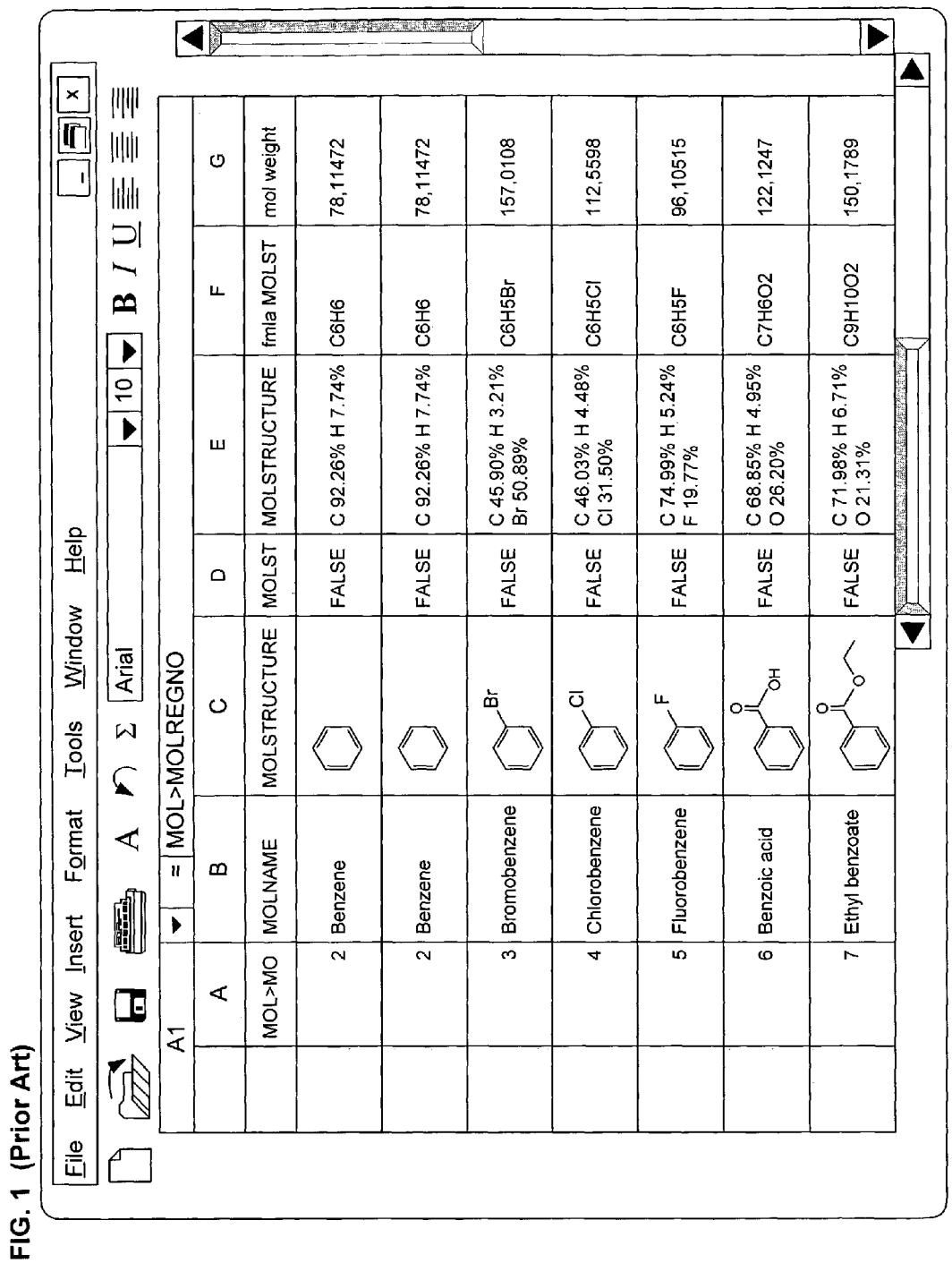
FIG. 1 illustrates, in simplified form, a simple SAR table in the prior art tool known as MDL ISIS for Microsoft Excel.
Figure 2:
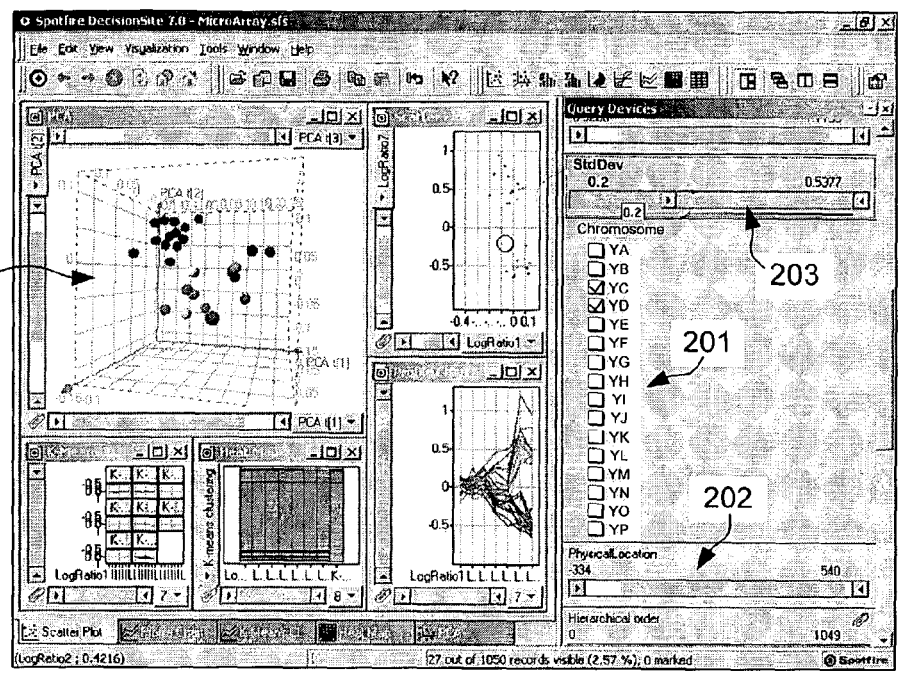
FIG. 2 illustrates dynamic filtering as made possible in the prior art visualization tool Spotfire DecisionSite.
Figure 4A:
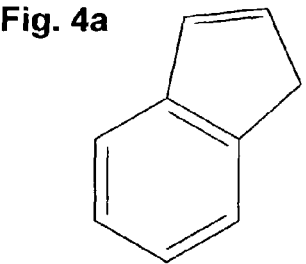
FIGS. 4a and 4b show the chemical structures of indene and benzene, respectively.
Figure 4B:
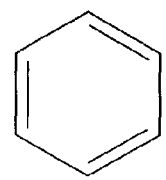

According to the invention, the source data set 910 includes structure identifiers 920 that correspond to any standard or proprietary numeric or alphanumeric system for identifying input elements (such as chemical compounds) and that have a standard graphical, symbolic counterpart. For example, a benzene ring is immediately identifiable to chemists by its symbol (FIG. 4b), but it could also be assigned an identifier such as the "2" in column A of FIG. 1.

In this invention, unlike in the prior art (such as FIG. 1), such identifiers and symbols are not just displayed statically as the result of a fixed query, but rather are filtered dynamically and interactively. This allows the user to better visualize activity and to find compounds of particular interest; in short, the invention displays a SAR table that is changed interactively. The advantages of this are illustrated below.

It is also important to note that the SAR table does not in itself perform dynamic filtering in the preferred embodiment of the invention; rather, filtering is performed by means of query devices. A substructure query device for dynamic structure-based filtering could, however, also be implemented as part of the SAR table itself, using conventional programming methods.

Figure 3:
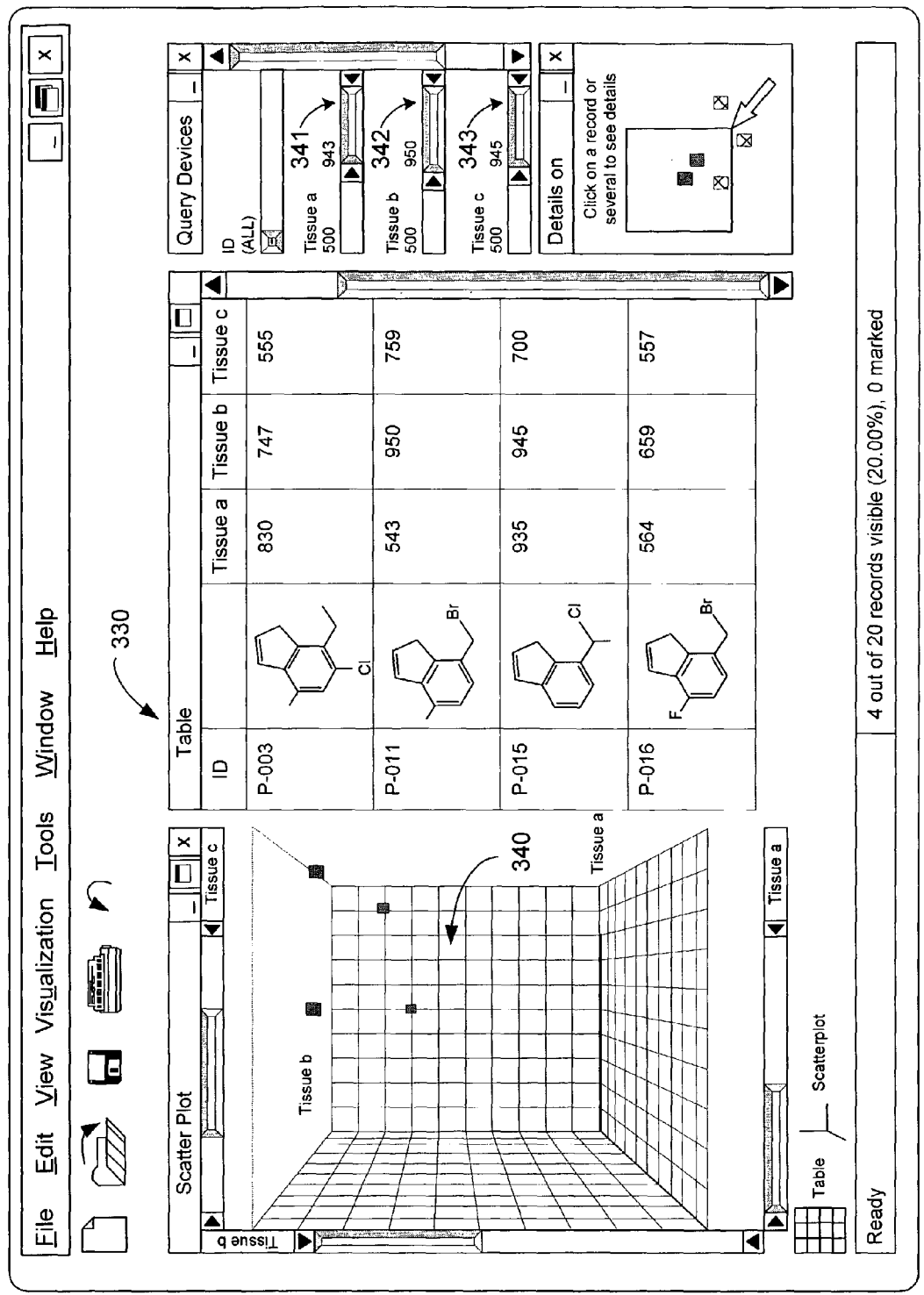
FIG. 3 illustrates a simple of example of dynamic, interactive visualization of a SAR table according to the invention.

FIG. 3 illustrates one example of a visualization that might be presented to a user with the interactive SAR table according to the invention implemented using Spotfire DecisionSite software for analysis and visualization. The data set contains a compound identifier (ID) as well as three different values describing the activity of the underlying chemical compound (candidate drug) against a certain drug target, for example, activity in three different tissue types Tissue a, Tissue b, Tissue c, (which could also be different individuals, different organisms, etc). In FIG. 3, four different compounds have IDs P-003, P-011, P-015, P-016. The activity for compound P-003 is 830, 747, and 555 for the three different tissue types.

By adjusting query devices—in FIG. 3, range sliders 341, 342, 343, for the tissue types a, b, c, respectively—the SAR table 330 is interactively filtered to show only those drug candidates whose activity exceeds some threshold value (such as 500, as indicated near the left end of each rang slider) in any combination of tissue types.

According to the invention, not only is alphanumeric information given in the table, but rather also the standard symbolic chemical representation of the respective compound. This enables the user to visually inspect the compound, which might reveal several interesting facts hard or impossible to discern from alphanumeric information alone. In the hypothetical example shown in FIG. 3, only compounds that contain an indene ring (see FIG. 4a) have a high activity for all tissue types, whereas compounds that contain a simple benzene ring (see FIG. 4b) might be active in only one specific tissue type.

As FIG. 3 illustrates, it is also possible to display the data in different forms. For example, a 3-D scatter plot 340 shows the same activity values for Tissues a, b, and c, as in the SAR table, with a data point for each of the four candidate compounds. This also illustrates an advantage of the invention: It would be difficult for a user to see, from a scatter plot or a table of numbers, that indene is a common feature—indeed, the main common feature—of the four compounds P-003, P-011, P-015, P-016. Other standard features of a visualization screen are shown in FIG. 3 simply for the sake of illustration.

Figure 5:
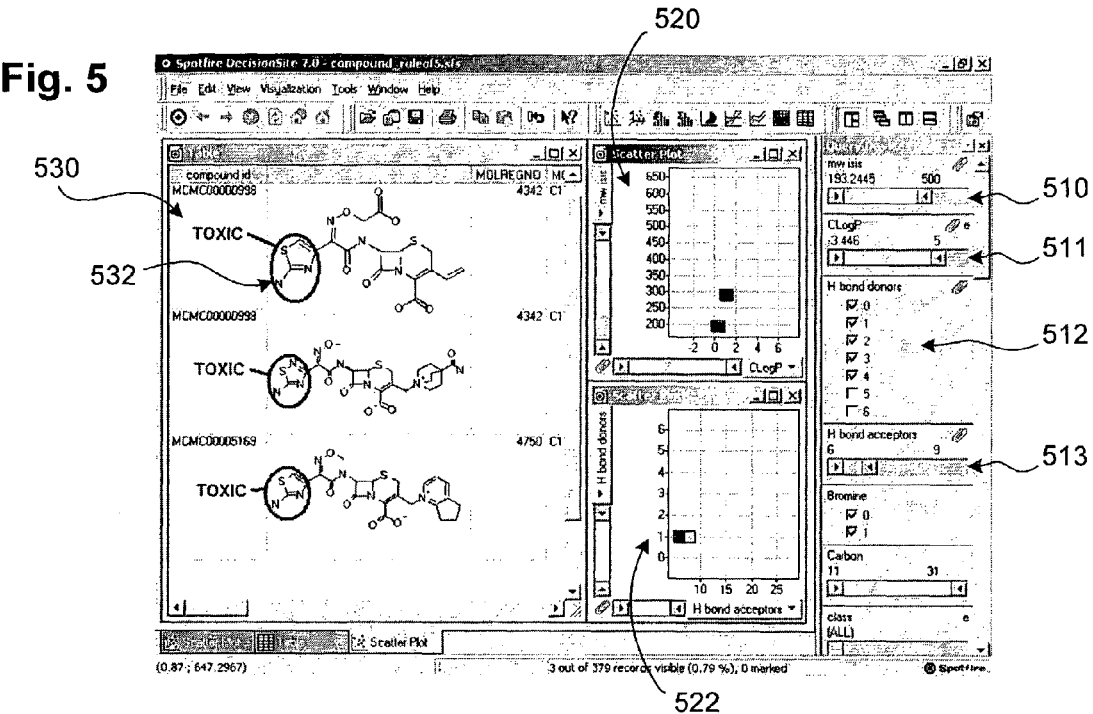
FIG. 5 illustrates how the invention may be used to look for drug candidates in an interactive SAR table.

A more advanced example of an SAR analysis involving an interactive SAR table according to the invention is illustrated in FIG. 5, in which it is assumed that one is looking for drug candidates. In this case, the underlying data set contains a set of descriptors that allow medicinal chemists to use Lipinski's popular "*Rule of 5*" to find compounds that are good candidates to become drugs. This rule states that the following properties signal ("drug-like") good absorption and permeation in biological systems:

Molecular weight <500

CLogP <5, where CLogP is the octanol/water partition coefficient

Number of hydrogen bond donors (OH+NH)<5

Number of hydrogen bond acceptors (O+N)<10

Using the interactive SAR table according to the invention, a chemist could use query devices to dynamically filter the compounds in the data set with respect to any combination of descriptors relevant to the Rule of 5, as well as any additional descriptors that might be relevant for a particular project, and then study how different structures and structure motifs are dominant or missing within different subsets of data. In FIG. 5, for example, the user may adjust filter ranges for molecular weight, CLogP ($\log_{10}P$), and the number of bond acceptors using range sliders 510, 511, and 513, respectively, and may choose how many bond donors should be present using a set of checkboxes 512. One advantage of using the analysis and visualization routines of U.S. Pat. No. 6,014,661 is that the choice of suitable initial query devices is automated; for example, because there are so few choices for the number of bond donors in this illustration, it is easier to check boxes than to have to set a range slider.

The input data set, when filtered according to the user's settings for the query devices, may be presented in different ways. For example, two different scatter plots 520 and 522 are included in the illustration to show molecular weight in relation to CLogP and H bond donors in relation to H bond acceptors, respectively. According to the invention, however, a SAR table 540 is also displayed in accordance with the user's query device settings.

For example, the analysis might reveal that all compounds that satisfy all four criteria in the Rule of 5 contain a toxic moiety 532 that makes the compounds impossible to use as drugs. Further use of the query devices might also allow the experienced user to notice a set of structures that satisfy three of the four criteria but that do not contain the toxic moiety. In such case, the chemist might decide to create a new combinatorial library using the non-toxic structures in the "3 out of 4 subset" as lead compounds. A SAR analysis of that library might yield more positive results.

Yet another extension of the interactive SAR table concept according to the invention uses various clustering techniques that allow data points to be ordered in such a way that points that are in some sense similar become located close to each other in the SAR table 630. For example, hierarchical clustering could be performed based on descriptors such as molecular weight and other chemical properties. Compounds that overall have similar properties will then become clustered together in the table, and the interactive SAR analysis might become more rewarding.

Figure 6:
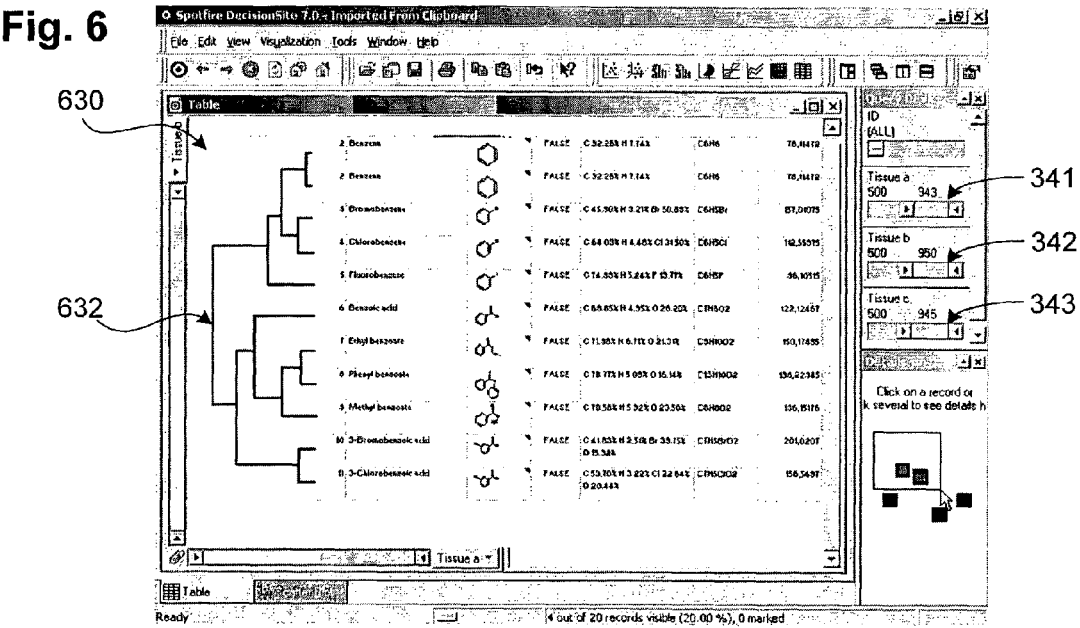
FIG. 6 illustrates an interactive SAR table with an embedded dendrogram.

A "dendrogram" 532 (from the Greek words "dendron" and "gramma" for "tree" and "letter") is a well known graphical technique in which U-shaped lines connect objects in a hierarchical tree. FIG. 6 illustrates an additional optional feature of the invention: a dendrogram 535 is generated using known methods and used to display the similarity values between compounds by linking those most closely related and creating "outward" connections as the strength of the similarity decreases.

When the data set includes structure keys, which are bits of information about the chemical structures themselves, compounds can even be clustered in such way that compounds with similar structures, for example, similar topological properties, appear close to each other in the table. This might add even more value to the analysis, since the filtering will more immediately reveal, by visual inspection, what areas of the table, in particular, which structure clusters, are affected by a certain filter.

The invention is not restricted to visualization of data relating to chemical compounds, although this is anticipated to be the most common and beneficial application of the invention. Rather, the invention may be used wherever there is some symbolic representation of a SAR table entry (for example, row).

What is claimed is:

1. A method for visualizing data for a user, comprising:
    sensing a user setting of at least one graphical query device corresponding to one of a plurality of chemical descriptors that express a property for the compound;
    filtering the data according to the user setting the graphical query device(s);
    generating and displaying a representation of a structure activity relationship (SAR) table corresponding to the filtered data;
    wherein the step of generating simultaneously displays information in the table in a single view for a first plurality of chemical compounds in a tabular display that includes a plurality of simultaneously displayed chemical descriptors and a plurality of simultaneously displayed graphical chemical descriptors for a first plurality of compounds, and wherein, for each of the compounds in the first plurality, the step of generating presents the SAR table as including:
        a graphical chemical structural description of the compound, and
        at least a subset of the plurality of chemical descriptors each showing a property for the compound, whereby structural properties and chemical descriptors of different members of the first plurality of compounds are all simultaneously viewable after the step of generating;
    sensing user adjustment of the setting(s) of the graphical query device(s), wherein the graphical query device(s) for which adjustment is sensed corresponds to one of the chemical descriptors;
    filtering the data according to the chemical descriptor for which user adjustment was sensed,
    regenerating and displaying the SAR table according to the adjusted setting(s); and
    wherein the step of regenerating simultaneously displays information in the table in a single view for a second plurality of chemical compounds in a tabular display that includes a different plurality of simultaneously displayed chemical descriptors and a different plurality of simultaneously displayed graphical chemical descriptors for the second plurality of chemical compounds; and wherein, for each of the compounds in the second plurality, the step of regenerating presents the SAR table as including:
        a graphical chemical structural description of the compound, and
        a plurality of chemical descriptors each showing a property for the compound, whereby structural properties and chemical descriptors of different members of the second plurality of compounds are all simultaneously viewable after the step of regenerating.

2. A method as in claim 1, further including generating and displaying query devices indicating choices for molecular weight, an octanol/water partition coefficient (CLogP), a number of hydrogen bond donors, and a number of hydrogen bond acceptors.

3. A method as in claim 1, further comprising graphically clustering SAR table entries according to a compound property.

4. A method as in claim 3, in which the step of graphically clustering SAR table entries comprises generating and displaying a dendrogram according to a 3 compound property.

5. A method as in claim 3, in which the compound property is topological.

6. The method of claim 1 wherein the graphical chemical structural description of the compound includes graphical representations of at least rings, positions of bonds on rings, and types of bonds.

7. A method for visualizing data for a user, comprising:
    sensing a user setting of at least one graphical query device, filtering a data set of chemical data relating to a plurality of chemical compounds to select a subset of the plurality of compounds based on the user setting, generating and displaying a representation of a structure-activity-relationship (SAR) table that includes an entry for each compound in the subset of the plurality of compounds in a single view, generating and displaying for each entry in the table a graphical chemical structural description of the compound for that entry, wherein the graphical chemical structural description for the compound shows chemical structural features for the compound in graphical format, generating and displaying for each entry in the table one or more alphanumeric chemical descriptors that each show a property for the compound for that entry, wherein the steps of generating and displaying simultaneously display information in the table in a single view for the subset of the plurality of chemical compounds in a tabular display that includes a plurality of simultaneously displayed alphanumeric chemical descriptions and a plurality of simultaneously displayed graphical chemical descriptions for the subset of compounds, whereby the chemical structural features and alphanumeric chemical properties of different members of the subset of the plurality of compounds are all simultaneously viewable after the steps of generating and displaying;

again sensing a user setting of at least one graphical query device that corresponds to one of the alphanumeric chemical descriptors after a change in the user setting has occurred, filtering the data set of chemical data relating to a plurality of chemical compounds to select a further subset of the plurality of compounds based on the changed user setting, updating the representation of the structure-activity-relationship (SAR) table to include an entry for each compound in the further subset of the plurality of compounds in a single view, further generating and displaying for each entry in the updated table a graphical chemical structural description of the compound for that entry, wherein the graphical chemical structural description for the compound shows chemical structural features for the compound in graphical format, further generating and displaying for each entry in the updated table the one or more chemical descriptors that each show a property for the compound for that entry, wherein the steps of further generating and displaying simultaneously display information in the table in a single view for the further subset of the plurality of chemical compounds in a tabular display that includes a plurality of simultaneously displayed alphanumeric chemical descriptions and a plurality of simultaneously displayed graphical chemical descriptions for the further subset of compounds, whereby the chemical structural features and alphanumeric chemical properties of different members of the subset of the plurality of compounds are all simultaneously viewable after the steps of further generating and displaying; and interactively repeating the steps of sensing, filtering, updating, generating an displaying in response to additional changes in the user setting of the query device.

8. A method as in claim 7, further including generating and displaying query devices indicating choices for molecular weight, an octanol/water partition coefficient (CLogP), a number of hydrogen bond donors, and a number of hydrogen bond acceptors.

9. A method as in claim 7, further comprising graphically clustering SAR table entries according to a compound property.

10. A method as in claim 9, in which the step of graphically clustering SAR table entries comprises generating and displaying a dendrogram according to a 3 compound property.

11. A method as in claim 9, in which the compound property is topological.

12. The method of claim 7 wherein the features include graphical representations of at least rings, positions of bonds on rings, and types of bonds.

* * * * *